US012766736B2

(12) United States Patent
Iida

(10) Patent No.: US 12,766,736 B2
(45) Date of Patent: Oct. 20, 2026

(54) PAINTING ROBOT AND PAINTING METHOD

(71) Applicant: ABB SCHWEIZ AG, Baden (CH)

(72) Inventor: Kisumi Iida, Tokyo (JP)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 19/203,793

(22) Filed: May 9, 2025

(65) Prior Publication Data

US 2025/0367835 A1 Dec. 4, 2025

(30) Foreign Application Priority Data

May 30, 2024 (JP) ................................ 2024-087658

(51) Int. Cl.
*B25J 11/00* (2006.01)
*B25J 9/16* (2006.01)

(52) U.S. Cl.
CPC ......... *B25J 11/0075* (2013.01); *B25J 9/1679* (2013.01)

(58) Field of Classification Search
CPC .... B25J 11/0075; B25J 9/1679; B41J 2/2139; B41J 3/4073; B05B 1/083; B05B 15/58; B05B 13/0433; B05B 13/002
USPC .......................................................... 700/245
See application file for complete search history.

(56) References Cited

U.S. PATENT DOCUMENTS

| | | | | |
|---|---|---|---|---|
| 9,944,068 | B2 | 4/2018 | Sato et al. | |
| 2017/0313057 | A1* | 11/2017 | Sato | B41J 2/2139 |
| 2022/0274129 | A1 | 9/2022 | Hozumi et al. | |
| 2022/0314263 | A1* | 10/2022 | Liu | B05B 12/00 |
| 2023/0098337 | A1* | 3/2023 | Nakano | B41J 2/04505 347/20 |
| 2023/0286272 | A1* | 9/2023 | Byun | B41J 2/06 |
| 2025/0050368 | A1 | 2/2025 | Tawata | |

FOREIGN PATENT DOCUMENTS

| | | | |
|---|---|---|---|
| JP | 2017196826 | A | 11/2017 |
| JP | 202352170 | A | 4/2023 |
| JP | 74225919 | B1 | 1/2024 |

* cited by examiner

*Primary Examiner* — Kira Nguyen
(74) *Attorney, Agent, or Firm* — Whitmyer IP Group LLC

(57) ABSTRACT

A head control unit of a painting robot is configured to implement recovery control for controlling driving of a piezoelectric substrate to increase the size of droplets of conforming dots surrounding a non-conforming dot if a specific nozzle is deemed to be non-conforming and not ejecting droplets correctly when painting a vehicle. In the recovery control, when the conforming dots surrounding the non-conforming dot reach a boundary of a painting range of the painting area, boundary ejection control is implemented to make the size of the droplets of the conforming dots a droplet size which is equal to the size in a state of normal ejection when the recovery control is not being implemented.

6 Claims, 10 Drawing Sheets

PAINTING ROBOT AND PAINTING METHOD

CROSS-REFERENCE TO RELATED APPLICATIONS

This application claims priority to Japan Patent application number JP 2024-087658, filed on May 30, 2024, which is herein incorporated by reference in its entirety.

TECHNICAL FIELD

The present invention relates to a painting robot.

BACKGROUND

Robot painting employing robots has become the norm on painting lines for painting vehicles such as automobiles. For example, Patent Document 1 describes the following configuration as an exemplary configuration relating to robot painting. The painting robot disclosed in Patent Document 1 has a feature in which, when an ejection defect occurs in a nozzle, a head is caused to vibrate in order to remedy the location of the ejection defect.

PRIOR ART DOCUMENTS

Patent Documents

[Patent Document 1] JP 2023-052170 A

SUMMARY OF THE INVENTION

Problems to be Solved by the Invention

The configuration disclosed in Patent Document 1 makes it possible to prevent white streaks, etc. from forming due to a complete absence of painting. However, the paint film thickness tends to decrease in the vicinity of a painting defect, therefore making it difficult to improve painting quality.

The present invention has been devised in light of this situation, and the objective thereof lies in providing a painting robot which is capable of improving painting quality by limiting a reduction in paint film thickness.

Means for Solving the Problems

In order to solve the problem above, a first aspect of the present invention provides a painting robot for painting a painting area of a vehicle, the painting robot comprising: a painting head unit provided with a painting head comprising a plurality of nozzles for ejecting paint droplets, and a piezoelectric substrate which is driven in order to push the droplets out from the nozzles; a robot arm which has the painting head unit mounted on a tip end thereof and causes the painting head unit to move to a desired position; and a control unit comprising a head control unit for controlling operation of the piezoelectric substrate of the painting head, and a robot arm control unit for controlling operation of the robot arm, characterized in that, if a specific nozzle is deemed to be a non-conforming nozzle which is not ejecting the droplets correctly when the vehicle is being painted, the head control unit implements recovery control for controlling driving of the piezoelectric substrate so as to increase the size of droplets of conforming dots, which surround a non-conforming dot corresponding to the non-conforming nozzle and which correspond to conforming nozzles ejecting the droplets without problem, and, in the recovery control: when the conforming dots surrounding the non-conforming dot reach a boundary of a painting range of the painting area, boundary ejection control is implemented so as to make the size of the droplets of the conforming dots a droplet size which is equal to the size in a state of normal ejection when the recovery control is not being implemented, and at this time also, non-boundary ejection control is implemented so that the size of droplets of conforming dots, which surround the non-conforming dot and are positioned further inside the painting range than the boundary, is greater than that of the conforming dots in the state of normal ejection.

Effects of the Invention

The present invention makes it possible to provide a painting robot capable of improving painting quality by limiting a reduction in paint film thickness.

EMBODIMENTS OF THE INVENTION

A painting robot 10 according to an embodiment of the present invention will be described below with reference to the drawings. It should be noted that in the following description, the X direction is a longitudinal direction of a nozzle-forming face 52 (painting head 53), the X1 side is the right-hand side of FIG. 3, and the X2 side is the left-hand side of FIG. 3, as required. Furthermore, the Y direction is a short-side direction (width direction) of the nozzle-forming face 52 (painting head 53), the Y1 side is the upper side of the page in FIG. 3, and the Y2 side is the lower side of the page in FIG. 3.

1. Outline of Painting Robot 10

The painting robot 10 of this embodiment serves to perform "painting" of an object being painted, which is a vehicle or a vehicle part (a vehicle part constituting a portion of the vehicle will also be described as a vehicle below) positioned on a painting line in an automobile manufacturing plant, and the purpose of the painting robot 10 is to form a paint film on a surface of the object being painted in order to protect the surface and impart an attractive appearance. Vehicles moving along the painting line at predetermined time intervals therefore need to be painted with a desired painting quality in a fixed time.

Furthermore, the painting robot 10 according to this embodiment is capable not only of forming the paint film, but also of forming various types of designs and images on the object being painted, namely a vehicle or a vehicle part. It should be noted that the object being painted is not limited to a vehicle or a vehicle part, provided that it is a component that needs painting, such as various types of components other than automotive components (e.g., external components for aircraft and railroads), etc.

1-1. Overall Configuration of Painting System 1 and Painting Robot 10

Figure 1:
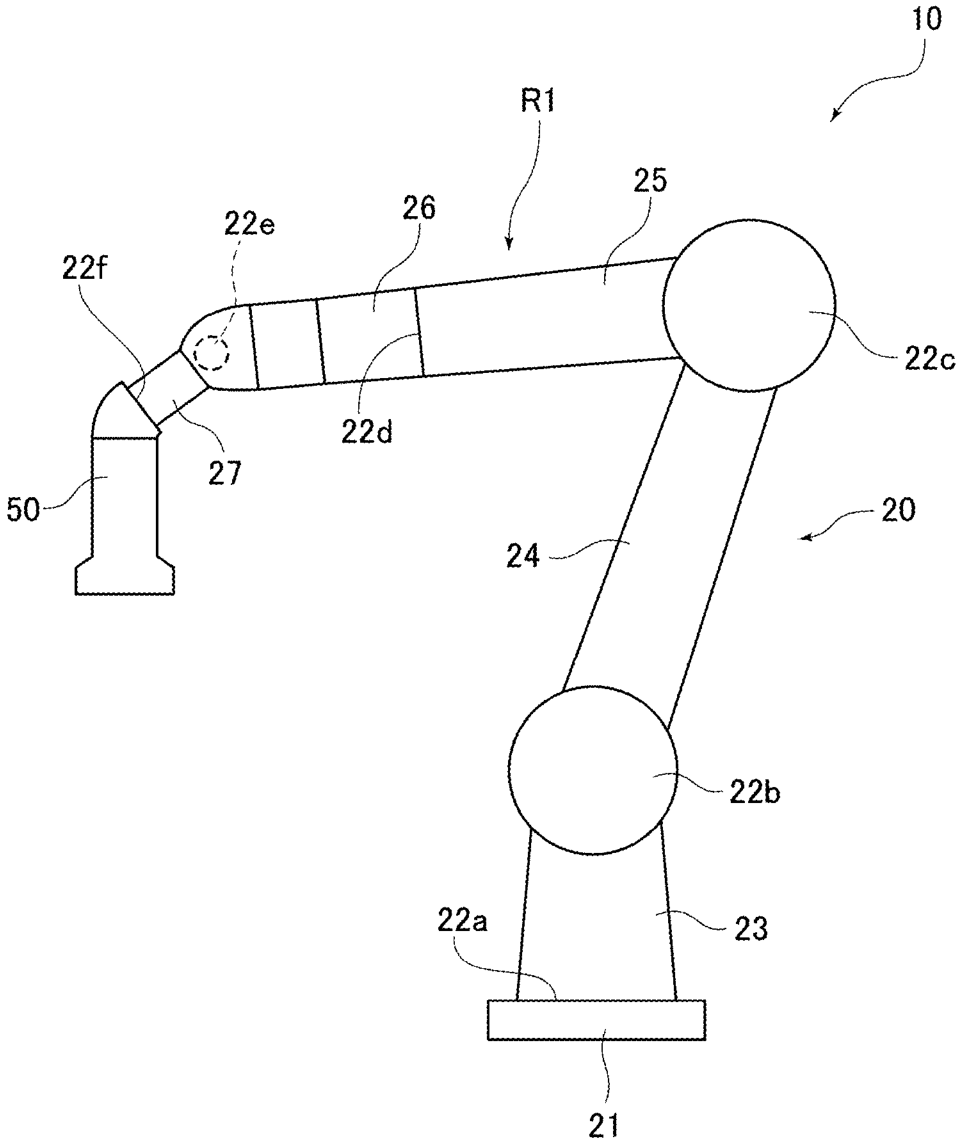
FIG. 1 is a schematic configuration diagram showing the overall configuration of a painting robot according to an embodiment of the present invention.
Figure 2:
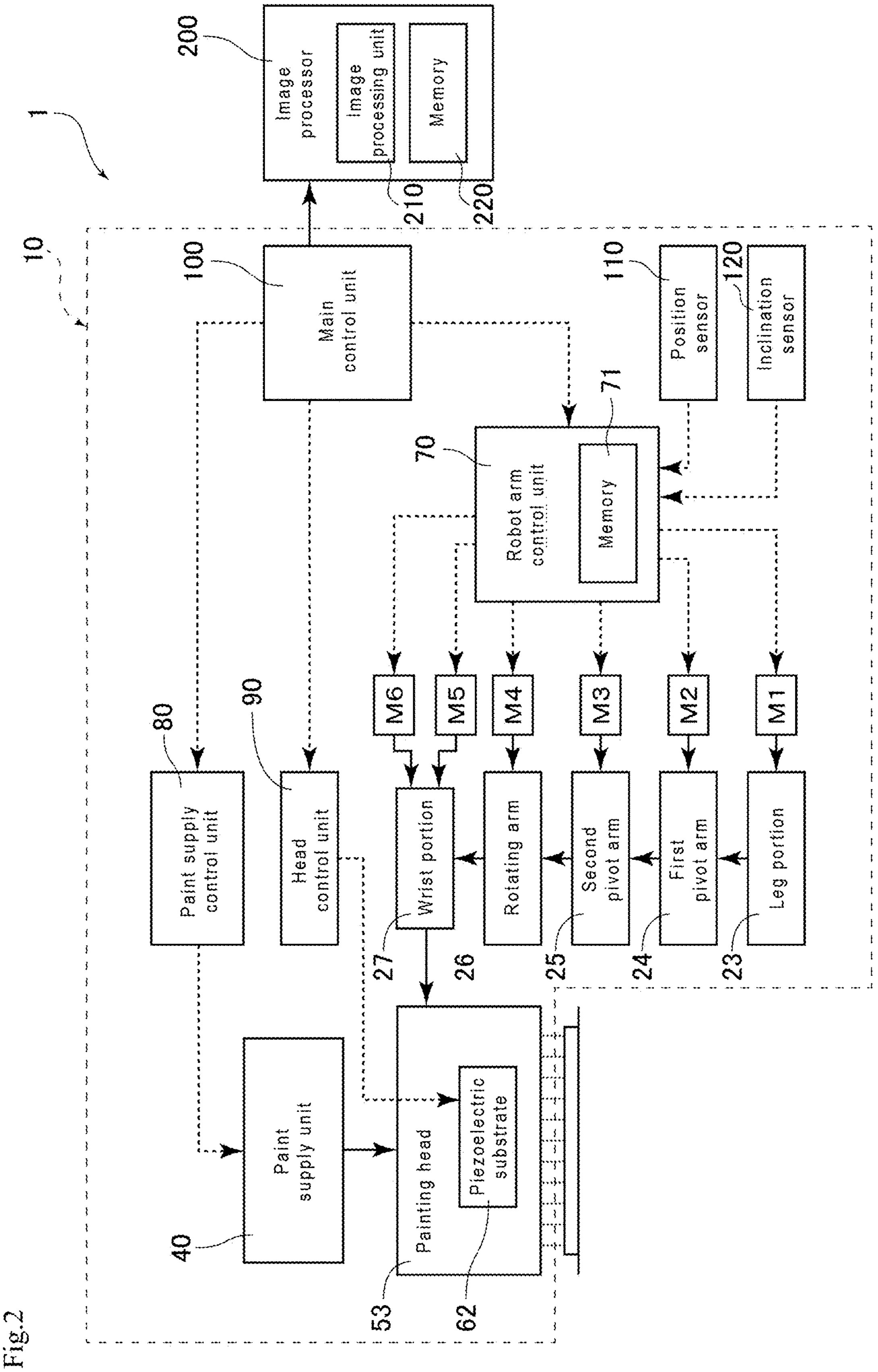
FIG. 2 shows a schematic configuration of a painting system comprising the painting robot shown in FIG. 1.

FIG. 1 is a schematic configuration diagram showing the overall configuration of the painting robot 10 according to an embodiment of the present invention. FIG. 2 shows a schematic configuration of the painting system 1 comprising the painting robot 10 shown in FIG. 1. As shown in FIG. 2, the painting system 1 comprises the painting robot 10 and an image processor 200.

1-2. Painting Robot 10

As shown in FIG. 1, the painting robot 10 comprises a robot main body 20 and a painting head unit 50 as its main components. The painting robot 10 shown in FIG. 1 is depicted as a 6-axis vertical articulated robot by way of example, but the painting robot 10 may be a robot of any type, such as a vertical articulated robot having a different number of axes to 6, a horizontal articulated robot, or an orthogonal robot.

1-3. Robot Main Body 20

As shown in FIG. 1, the robot main body 20 comprises, as its main components: a stand 21, first to sixth rotary shafts **22*a*-22*f*, a leg portion 23, a first pivot arm 24, a second pivot arm 25, a rotating arm 26, a wrist portion 27, and motors M1-M6 (see FIG. 2) for driving the above components. It should be noted that the parts from the leg portion 23 to the wrist portion 27 correspond to a robot arm R1, but parts other than these such as the stand 21 may also correspond to the robot arm R1**.

Among these, the stand 21 is a part which is installed at a point of installation such as a floor surface, but the stand 21 may equally be capable of travel in relation to the point of installation. Furthermore, the leg portion 23 is a part standing upright from the stand 21, and is provided so as to be rotatable in relation to the stand 21 via the first rotary shaft **22*a* by means of driving of the motor M1 (see FIG. 2). Note that the leg portion 23 may equally be configured not to rotate in relation to the stand 21**.

Furthermore, the first pivot arm 24 is provided at an upper end of the leg portion 23 so as to be pivotable via the second rotary shaft **22*b* by means of driving of the motor M2. The second pivot arm 25 is further provided on a tip end side of the first pivot arm 24 so as to be pivotable via the third rotary shaft 22*c* by means of driving of the motor M3**.

The rotating arm 26 is furthermore provided on a tip end side of the second pivot arm 25 so as to be rotatable about the second pivot arm 25. The rotating arm 26 is rotatable via the fourth rotary shaft **22*d* by means of driving of the motor M4. The wrist portion 27 is furthermore provided on a tip end side of the rotating arm 26. The wrist portion 27 is capable of rotational movement about a shaft portion having a plurality of (such as two) different orientations, for example, by means of driving of the motor M5 and the motor M6. The rotary shafts enabling this rotational movement are the fifth rotary shaft 22*e* and the sixth rotary shaft 22*f*, respectively, in FIG. 1. This enables the orientation of the painting head unit 50** to be controlled very accurately. Note that there may be any number of shaft portions provided that there are at least two.

Furthermore, the painting head unit 50 is mounted on the wrist portion 27, but the painting head unit 50 may also be detachably provided on the wrist portion 27.

1-4. Paint Supply Unit 40

The painting system 1 and the painting robot 10 are provided with a paint supply unit 40, as shown in FIG. 2. The paint supply unit 40 is a part for supplying paint toward the painting head unit 50. To this end, the paint supply unit 40 comprises: a supply line 41 (see FIG. 4) for supplying the paint from a paint storage portion which is not depicted; a pump which is not depicted; valves, etc. which are not depicted; and a return flow path 42 for recovering paint which has not been ejected.

It should be noted that when a configuration is adopted where the paint is supplied from outside the painting robot 10, the painting robot 10 need not comprise a part for storing the paint, and the part for storing the paint may be provided outside the painting robot 10.

1-5. Painting Head Unit 50

Figure 3:
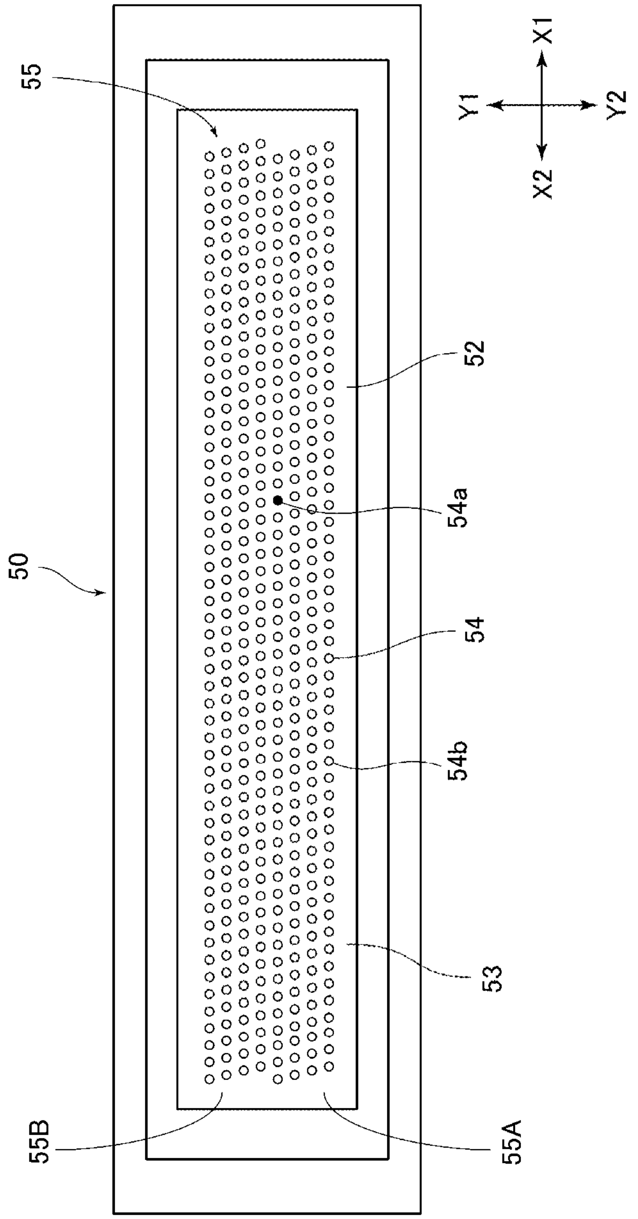
FIG. 3 shows a state in which a nozzle-forming face of a painting head unit of the painting robot shown in FIG. 1, from which paint is ejected, is seen from a front face.

The painting head unit 50 will be described next. FIG. 3 shows a state in which the nozzle-forming face 52 of the painting head unit 50, from which paint is ejected, is seen from a front face. As shown in FIG. 3, the painting head unit 50 comprises a head cover (not depicted) and various components are built into the head cover. As shown in FIG. 3, a plurality of nozzle rows 55 comprising nozzles 54 extending in a direction inclined in relation to a longitudinal direction of the painting head unit 50 are provided on the nozzle-forming face 52. In this embodiment, the nozzle rows 55 are provided with: first nozzle rows 55A which are present on one side (Y2 side) in a main scanning direction (Y direction); and second nozzle rows 55B which are present on another side (Y1 side) in the main scanning direction.

It should be noted that drive timing of the nozzles 54 is controlled when paint is ejected so that droplets ejected from nozzles 54 in the second nozzle rows 55B land between droplets ejected from adjacent nozzles 54 in the first nozzle rows 55A. This makes it possible to increase the density of dots during painting.

As shown in FIG. 3, there is a single painting head 53 on the nozzle-forming face 52. However, a head group comprising multiple painting heads 53 may also be present on the nozzle-forming face 52. A configuration in which the plurality of painting heads 53 are aligned in a staggered arrangement may be cited as an example in this case, but the painting heads 53 in the head group need not have a staggered arrangement.

Figure 4:
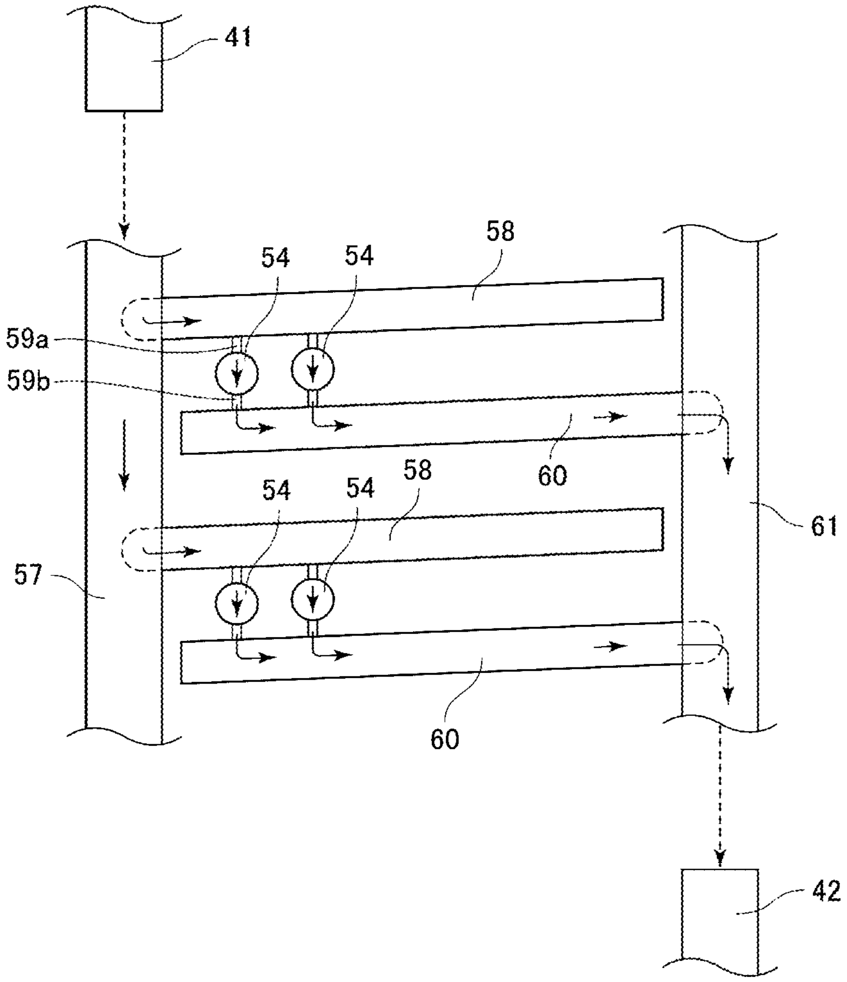
FIG. 4 shows a schematic configuration for supplying paint to nozzles of the painting robot shown in FIG. 1.
Figure 5:
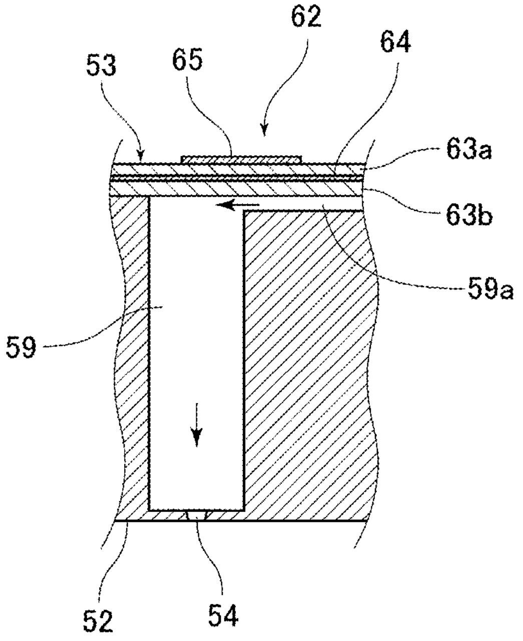
FIG. 5 is a view in cross section showing a configuration of the painting robot shown in FIG. 1 in the vicinity of a row-direction supply flow path, a nozzle pressurization chamber and a row-direction discharge flow path.

FIG. 4 shows a schematic configuration for supplying paint to the nozzles 54. FIG. 5 is a view in cross section showing a configuration in the vicinity of a row-direction supply flow path 58, a nozzle pressurization chamber 59 and a row-direction discharge flow path 60. As shown in FIGS. 4 and 5, the painting head 53 comprises: a supply-side large flow path 57, row-direction supply flow paths 58, nozzle pressurization chambers 59, row-direction discharge flow paths 60, and a discharge-side large flow path 61. The supply-side large flow path 57 is a flow path through which the paint is supplied from a supply path 41. Furthermore, the row-direction supply flow paths 58 are flow paths through which the paint inside the supply-side large flow path 57 is distributed.

Furthermore, the nozzle pressurization chambers 59 are connected to the row-direction supply flow paths 58 via nozzle supply flow paths 59*a*. By this means, the paint is supplied from the row-direction supply flow paths 58 to the nozzle pressurization chambers 59. The nozzle pressurization chambers 59 are provided correspondingly with the number of nozzles 54, and the paint inside can be ejected from the nozzles 54 using a piezoelectric substrate 62 which will be described later.

Furthermore, the nozzle pressurization chambers 59 are connected to the row-direction discharge flow paths 60 via nozzle discharge flow paths 59*b*. The paint ejected from the nozzles 54 is therefore discharged from inside the nozzle pressurization chambers 59 to the row-direction discharge flow paths 60 via the nozzle discharge flow paths 59*b*. Furthermore, the row-direction discharge flow paths 60 are connected to the discharge-side large flow path 61. The discharge-side large flow path 61 is a flow path in which the paint discharged from each of the row-direction discharge flow paths 60 merges. The discharge-side large flow path 61 is connected to a return flow path 42.

By virtue of this configuration, the paint supplied from the supply path 41 is ejected from the nozzles 54 via the supply-side large flow path 57, the row-direction supply flow paths 58, the nozzle supply flow paths 59*a*, and the nozzle pressurization chambers 59. Furthermore, the paint which has not been ejected from the nozzles 54 is returned from the nozzle pressurization chambers 59 to the return flow path 42 via the nozzle discharge flow paths 59*b*, the row-direction discharge flow paths 60, and the discharge-side large flow path 61.

It should be noted that FIG. 4 shows a configuration in which one row-direction discharge flow path 60 is arranged correspondingly with one row-direction supply flow path 58. However, it is also possible for multiple (e.g., two) row-direction discharge flow paths 60 to be arranged correspondingly with one row-direction supply flow path 58. Furthermore, it is equally possible for one row-direction discharge flow path 60 to be arranged correspondingly with multiple row-direction supply flow paths 58.

Furthermore, as shown in FIG. 5, the piezoelectric substrate 62 is arranged on a top face (the face on the opposite side to the nozzle 54) of the nozzle pressurization chamber 59. The piezoelectric substrate 62 comprises two piezoelectric ceramic layers 63*a*, 63*b* constituting piezoelectric bodies, and further comprises a common electrode 64 and an individual electrode 65. The piezoelectric ceramic layers 63*a*, 63*b* are members capable of expanding and contracting when an external voltage is applied thereto. Ferroelectric ceramic materials such as lead zirconate titanate (PZT), NaNbO3, BaTiO3, (BiNa)NbO3, and BiNaNb5O15 may be used as the piezoelectric ceramic layers 63*a*, 63*b*.

Furthermore, as shown in FIG. 5, the common electrode 64 is arranged between the piezoelectric ceramic layer 63*a* and the piezoelectric ceramic layer 63*b*. A common-electrode surface electrode (not depicted) is furthermore formed on an upper face of the piezoelectric substrate 62. The common electrode 64 and the common-electrode surface electrode are electrically connected through a via conductor (not depicted) present on the piezoelectric ceramic layer 63*a*. Furthermore, individual electrodes 65 are respectively arranged in locations facing the nozzle pressurization chambers 59. The part of the piezoelectric ceramic layer 63*a* between the common electrode 64 and the individual electrode 65 is polarized in a thickness direction. The piezoelectric ceramic layer 63*a* is therefore distorted under a piezoelectric effect when a voltage is applied to the individual electrode 65. When a predetermined drive signal is applied to the individual electrode 65, the piezoelectric ceramic layer 63*b* therefore undergoes a relative change so as to reduce the volume of the nozzle pressurization chamber 59, and paint is ejected as a result.

It should be noted that the common electrode 64 is arranged on the top face of the nozzle pressurization chamber 59 in FIG. 5, but this does not mean that the configuration is limited to that shown in FIG. 5 in which the common electrode 64 is arranged on the top face of the nozzle pressurization chamber 59. For example, it is possible to adopt a configuration in which the common electrode 64 is arranged on a side face (a face orthogonal or roughly orthogonal to the top face) of the nozzle pressurization chamber 59, or to adopt any other configuration provided that the paint can be properly ejected from the nozzles 54.

1-6. Other Configuration of Painting Head Unit

Figure 6:
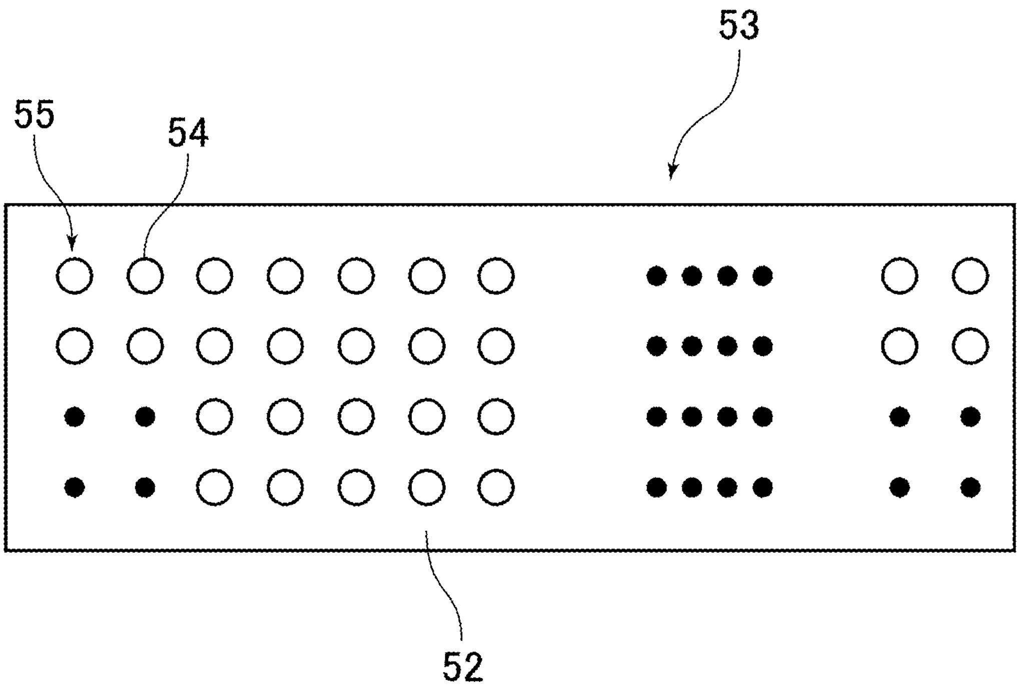
FIG. 6 is a plan view showing the configuration of the nozzle-forming face of another painting head unit different from the painting head unit shown in FIG. 3.

Another configuration of the painting head unit 50 will be described next. FIG. 6 is a plan view showing the configuration of the nozzle-forming face 52 of another painting head unit 50. As shown in FIG. 6, the nozzle rows 55 may be formed by arranging a plurality of nozzles 54 side-by-side along the short-side direction (width direction; Y direction) of the painting head 53. It should be noted that in the configuration shown in FIG. 6, the nozzle rows 55 are formed by arranging the plurality of nozzles 54 side-by-side in the short-side direction (width direction; main scanning direction) of the painting head 53, but it is equally possible to adopt a configuration in which only one (a single) nozzle 54 is arranged in the short-side direction (width direction; main scanning direction) of the painting head 53. That is to say, a nozzle row 55 may consist of one nozzle 54.

Furthermore, when the vehicle is painted using a painting head 53 such as shown in FIG. 6, painting may be performed in a state in which the longitudinal direction of the painting head 53 is slightly inclined in relation to the main scanning direction of the painting head 53. For example, since the nozzle rows 55 are inclined by a predetermined angle in relation to the main scanning direction in the configuration of the painting head 53 shown in FIG. 3, the short-side direction of the painting head 53 shown in FIG. 6 should be inclined by a predetermined angle in relation to the main scanning direction of the painting head 53. This inclination makes it possible to perform painting comparable with that of the painting head 53 shown in FIG. 3 simply by adjusting the timing of ejecting paint from the nozzles 54.

1-7. Control Configuration of Painting System 1

The control configuration for controlling operation of the painting system 1 will be described next. Note that the control configuration described below corresponds to the control unit. As shown in FIG. 2, the painting robot 10 comprises: a robot arm control unit 70, a paint supply control unit 80, a head control unit 90, a main control unit 100, a position sensor 110, and an inclination sensor 120. Furthermore, the painting robot 10 is connected to the image processor 200 to thereby construct the painting system 1.

Moreover, the robot arm control unit 70, paint supply control unit 80, head control unit 90, main control unit 100, and an image processing unit 210 which will be described later are configured from a central processing unit (CPU), a memory such as a storage area (read only memory (ROM) and random access memory (RAM), or non-volatile memory, etc.), and other components. Moreover, the image processing unit 210 may employ a graphics processing unit (GPU) instead of or as well as a CPU which has excellent image processing performance.

Furthermore, the painting robot 10 may also comprise various types of sensors which are not depicted, with output from these sensors being input to any of the robot arm control unit 70, paint supply control unit 80, head control unit 90, and main control unit 100. Examples of the various types of sensors which may be cited include an acceleration sensor, an angular velocity sensor, a position detection sensor for detecting the position of each drive unit, and an image sensor, etc., but other types of sensors may also be used.

Here, the robot arm control unit 70 is a part for controlling driving of the motors M1-M6. The robot arm control unit 70 comprises a memory 71 which stores programs and data created by robot teaching.

The robot arm control unit 70 controls driving of the motors M1-M6 on the basis of the programs and data stored in the memory 71, and image processing by the image processing unit 210 of the image processor 200. By means of this control, the painting head unit 50 can be made to pass, at a predetermined speed, through a desired position for performing painting, and to stop at a predetermined position.

The memory 71 stores data relating to the trajectory of the painting head 53 (trajectory data), and attitude data relating to the attitude of the painting head 53 such as inclination, created by means of robot teaching which takes account of the painting width which can be painted by the painting head 53. It should be noted that the memory 71 is provided in the painting robot 10, but the memory 71 may also be external to the painting robot 10, and information may be sent/received to/from this memory 71 via a wired or wireless communication means.

Furthermore, the paint supply control unit 80 is a part for controlling the supply of paint to the painting head unit 50, and specifically controls the operation of the pump and valves, etc. provided in the paint supply unit 40. It should be noted that the paint supply control unit 80 preferably controls the operation of the pump and valves so that the paint is supplied at a constant pressure to the painting head unit 50 from which the paint is supplied. Note that the paint supply control unit 80 corresponds to a pressure control unit.

Furthermore, the head control unit 90 is a part for controlling operation of the piezoelectric substrate 62 inside the painting head unit 50 on the basis of image processing by the image processing unit 210. When a predetermined position in the trajectory data has been reached according to the means for detecting position, such as the position sensor 110 and inclination sensor 120 which will be described later, the head control unit 90 controls ejection of paint on the basis of split painting data corresponding to the position and a painting path. It should be noted that in order to achieve a uniform film thickness on the vehicle in this case, the number of dots (number of droplets) ejected from the nozzles 54 is controlled by controlling a drive frequency of the piezoelectric substrate 62, and the size of the droplets ejected from the nozzles 54 is controlled by controlling an amount of deformation of the piezoelectric substrate 62 on the basis of the drive frequency and/or voltage applied to the piezoelectric substrate 62.

When the droplet size is controlled by controlling the amount of deformation of the piezoelectric substrate 62 on the basis of the drive frequency applied to the piezoelectric substrate 62, the maximum droplet size is achieved by driving the piezoelectric substrate 62 at a drive frequency matching the natural frequency of the piezoelectric substrate 62. It is therefore possible to control the droplets to a smaller size as the drive frequency applied deviates further from the natural frequency. Furthermore, when the droplet size is controlled by controlling the amount of deformation of the piezoelectric substrate 62 on the basis of the voltage applied to the piezoelectric substrate 62, it is possible to control the droplets to a larger size the higher the voltage applied to the piezoelectric substrate 62.

Furthermore, the main control unit 100 is a part for sending predetermined control signals to the robot arm control unit 70, the paint supply control unit 80, and the head control unit 90 so that the motors M1-M6, the paint supply unit 40 and the piezoelectric substrate 62 collaborate to paint the object being painted.

Furthermore, the position sensor 110 is a sensor for detecting the current position of the painting head 53. A rotary encoder, a resolver, a laser sensor or various other types of sensor may be used as this position sensor 110. Furthermore, the inclination sensor 120 is a sensor for detecting the angle of inclination of the painting head 30. A gyro sensor, an acceleration sensor, a tilt sensor or various other types of sensor may be used as this inclination sensor 120.

Furthermore, the painting system 1 is provided with the image processor 200. The image processor 200 comprises the image processing unit 210 and a memory 220. The image processing unit 210 is a part for creating image data for each painting path constituting the pathway on which the painting head 53 performs painting.

Furthermore, the memory 220 is a part for storing the image data for each painting path correspondingly with a painting sequence.

It should be noted that a computer, for example, corresponds to the image processor 200, and this computer may be a component forming part of the painting robot 10 or may be provided separately from the painting robot 10. When the image processor 200 is provided separately from the painting robot 10, data is sent and received between the image processor 200 and the painting robot 10 by means of wired communication or wireless communication. It should be noted that even if the image processor 200 is provided separately from the painting robot 10, the image processor 200 may be included in the concept of the painting robot 10 or may not be included in the concept of the painting robot 10.

2. Droplet Ejection Control

In the painting system 1 and painting robot 10 having the configuration above, the head control unit 90 drives the piezoelectric substrate 62 by means of a command from the main control unit 100 in order to eject paint onto the object being painted, and a predetermined test pattern (not depicted) is printed. The test pattern serves to check for gaps in the paint ejected from the nozzles 54, as is normally performed in inkjet printers. By checking the test pattern, it is possible to judge which nozzle(s) 54 is (are) not ejecting paint correctly.

After the test pattern has been printed, a camera (not depicted) is actuated by means of a command from the main control unit 100 to capture an image of the test pattern, whereby imaging data is obtained. The imaging data is then sent to the image processor 200 by way of wireless or wired communication, the image processor 200 compares the imaging data with determination image data, extracts unpainted lines from the test pattern, and thereby identifies a nozzle 54 (non-conforming nozzle 54*a* in FIG. 3) which is not ejecting droplets correctly.

(a) Basic Control in Recovery Control

When there is a non-conforming nozzle 54*a* identified in the manner above, the head control unit 90 implements recovery control (basic recovery control) by means of a command from the main control unit 100, in order to compensate for incorrect ejection of droplets by the non-conforming nozzle 54*a* when the vehicle is being painted. Here, FIG. 7 shows the state of dots when painting is performed, where (a) shows the state of dots before recovery control is implemented, and (b) shows the state of dots after recovery control has been implemented.

Figure 7:
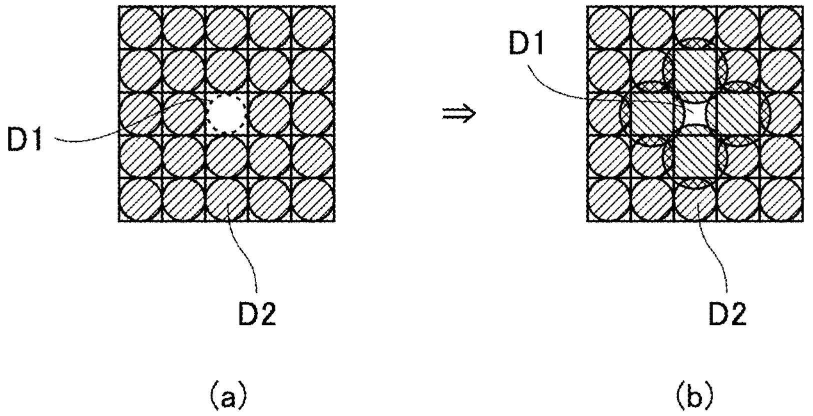
FIG. 7 shows the state of dots when painting is performed by means of the painting robot shown in FIG. 1, where (a) shows the state of dots before recovery control is implemented, and (b) shows the state of dots after recovery control has been implemented.

In the recovery control, driving of the piezoelectric substrate 62 is controlled so as to increase the size of droplets of conforming dots D2 (i.e., areas where droplets have been ejected), which surround a non-conforming dot D1 (i.e., an area where a droplet has not been ejected) corresponding to the non-conforming nozzle 54*a* and which correspond to nozzles (denoted conforming nozzles 54*b*) ejecting the droplets without problem, as shown in FIG. 7(*b*). Accordingly, the formation of painting gaps due to the presence of the non-conforming dot D1 can be prevented, as compared to the case in FIG. 7(*a*) in which the recovery control is not performed.

Figure 8:
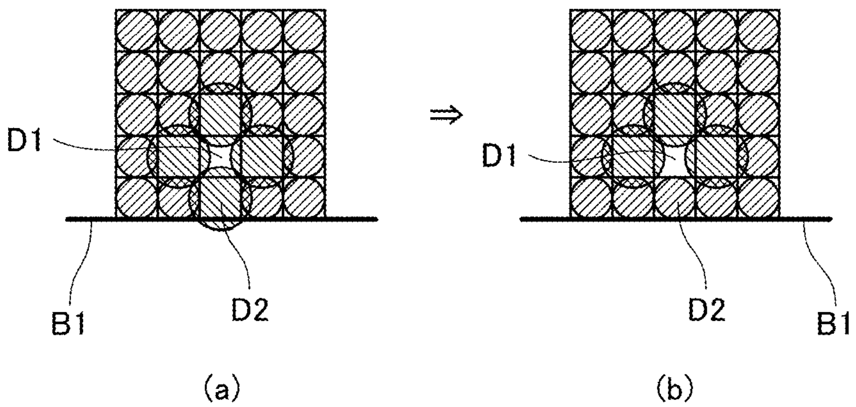
FIG. 8 shows the state of dots when painting is performed in the vicinity of a boundary B1 of a painting range by means of the painting robot shown in FIG. 1, where (a) shows the state of dots before boundary ejection control is implemented, and (b) shows the state of dots after boundary ejection control has been implemented.

(b) Boundary Ejection Control and Non-Boundary Ejection Control in the Painting Area FIG. 8 shows the state of dots when painting is performed in the vicinity of a boundary B1 of a painting range, where (a) shows the state of dots before boundary ejection control is implemented, and (b) shows the state of dots after boundary ejection control has been implemented.

As shown in FIG. 8(*a*), if the basic recovery control above is performed when the conforming dots D2 surrounding the non-conforming dot D1 reach a boundary B1 (edge) of a painting range of a painting area CP1 (see FIG. 9), then there will be a sense of coarse painting resolution at the boundary B1 because there are dots formed by large-sized droplets landing, which gives the impression of lower painting quality.

For this reason, the head control unit 90 controls operation (corresponding to boundary ejection control) of the piezoelectric substrate 62 so as to make the size of the droplets of the conforming dots D2 reaching the boundary B1 of the painting range a droplet size which is equal to the size in a state of normal ejection when the recovery control is not being implemented, as shown in FIG. 8(*b*).

Meanwhile, the head control unit 90 controls operation (corresponding to non-boundary ejection control) of the piezoelectric substrate 62 so as to increase the size of droplets of conforming dots D2 which are present around the non-conforming dot D1 and are positioned further inside the painting range than the boundary B1 of the painting area (not at the boundary).

This control makes it possible to limit a drop in painting quality at the boundary B1 of the painting range. Furthermore, driving of the piezoelectric substrate 62 is controlled so as to increase the size of droplets of the conforming dots D2 which are not at the boundary, and it is therefore possible to limit a drop in painting quality by covering the non-conforming dot D1 corresponding to the non-conforming nozzle 54*a*.

(c) Inclination of Painting Area

Figure 9:
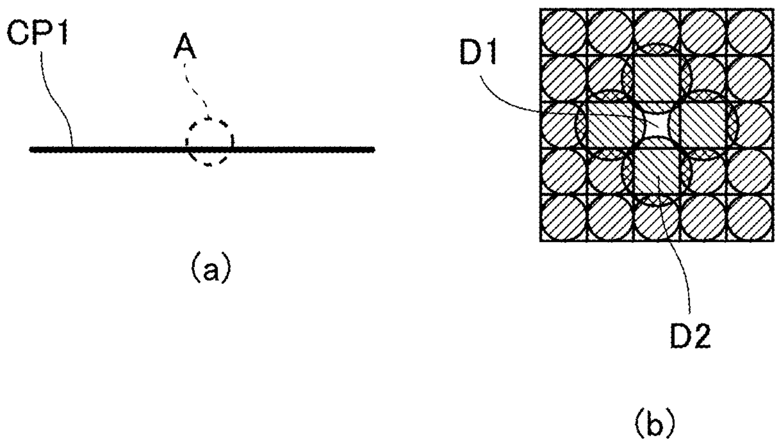
FIG. 9(*a*) shows a state in which a painting area of a vehicle is seen from the side, and (b) shows an arrangement of dots at the part enclosed by the broken line A in (a).

As shown in FIG. 9(*a*), when the painting area CP1 of the vehicle is on a horizontal plane or is in a predetermined angle of inclination range close to a horizontal plane, the dots of droplets which have landed do not flow downward to a great extent. It should be noted that in FIG. 9, (a) shows a state in which the painting area CP1 of the vehicle is seen from the side, and (b) shows an arrangement of dots (non-conforming dot D1 and conforming dots D2) at the part enclosed by the broken line A in (a). In such a case, as shown in FIG. 9(*b*), the head control unit 90 controls operation of the piezoelectric substrate 62 so that the size of droplets of a plurality of the conforming dots D2 surrounding the non-conforming dot D1 is greater than that of conforming dots D2 in the state of normal ejection.

Figure 10:
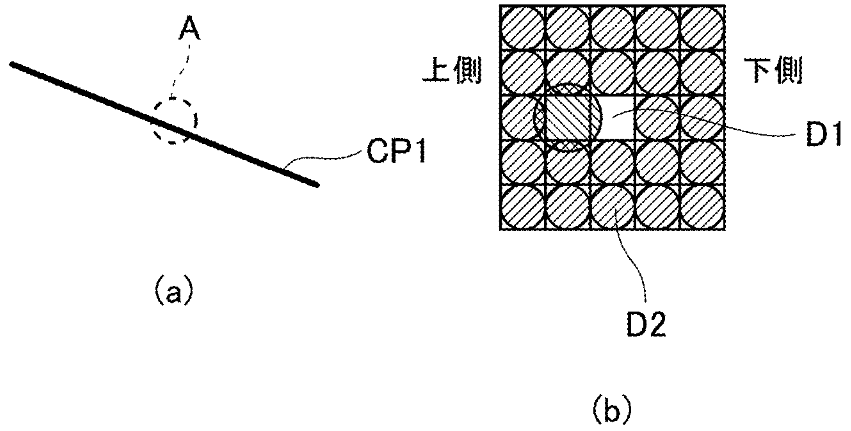
FIG. 10(*a*) shows a state in which a painting area of a vehicle is seen from the side, and (b) shows an arrangement of dots at the part enclosed by the broken line A in (a).

Meanwhile, as shown in FIG. 10(*a*), when the painting area CP1 of the vehicle is inclined beyond the predetermined angle of inclination, the dots of droplets which have landed are very likely to flow downward. In such a case, as shown in FIG. 10(*b*), the head control unit 90 controls the piezoelectric substrate 62 so that the size of a droplet of the conforming dot D2 positioned above the non-conforming dot D1 among the plurality of conforming dots D2 surrounding the non-conforming dot D1 is greatest among the conforming dots D2 surrounding the non-conforming dot D1. It should be noted that in FIG. 10, (a) shows a state in which the painting area CP1 of the vehicle is seen from the side, and (b) shows an arrangement of dots (non-conforming dot D1 and conforming dots D2) at the part enclosed by the broken line A in (a).

Accordingly, when the paint flows downward from above from the droplet of the conforming dot D2, it is possible to achieve a state in which the flowing paint conceals the non-conforming dot D1.

It should be noted that even if paint flows from droplets of conforming dots D2 other than the conforming dot D2 positioned above the non-conforming dot D1, it is not possible to achieve a state in which the flowing paint conceals the non-conforming dot D1. In this case, the head control unit 90 controls the piezoelectric substrate 62 so that the size of droplets of these conforming dots D2 is greater than in the state of normal ejection (but still preferably smaller than the conforming dot D2 positioned above), or equal to the size in the state of normal ejection.

(d) Supplementary Control with Overlap Region OL

Figure 11:
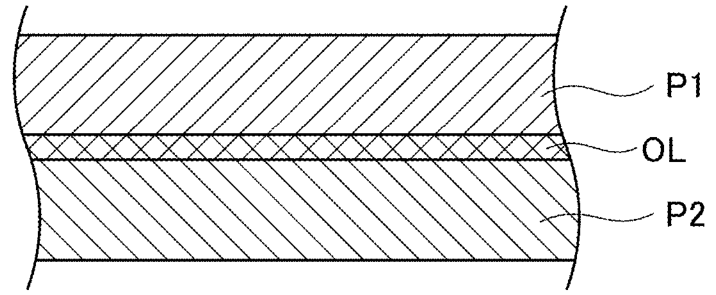
FIG. 11 shows a state in which an overlap region is provided between a first painting path and a second painting path when painting is performed by means of the painting robot shown in FIG. 1.

FIG. 11 shows a state in which an overlap region OL is provided between a first painting path P1 and a second painting path P2. As shown in FIG. 11, it is feasible for there to be a non-conforming dot D1 for which the painting defect caused by the non-conforming dot D1 still remains without having been resolved by controlling the size of the droplets within the first painting path P1 which is the same painting path. When it is determined that a non-conforming dot D1 remaining in this way is still present within the first painting path P1, the head control unit 90 performs supplementary control by means of a command from the main control unit 100 so that an overlap region OL overlapping the first painting path is provided on the second painting path P2 which is the subsequent painting path, and conforming dots D2 positioned over the remaining non-conforming dot D1 are provided within the overlap region OL.

Accordingly, the remaining non-conforming dot D1 is concealed by the conforming dots D2, and it is possible to prevent a gap in painting at the location of the remaining non-conforming dot D1.

(e) Ejection of Small-Sized Droplets in Boundary Ejection Control

Figure 12:
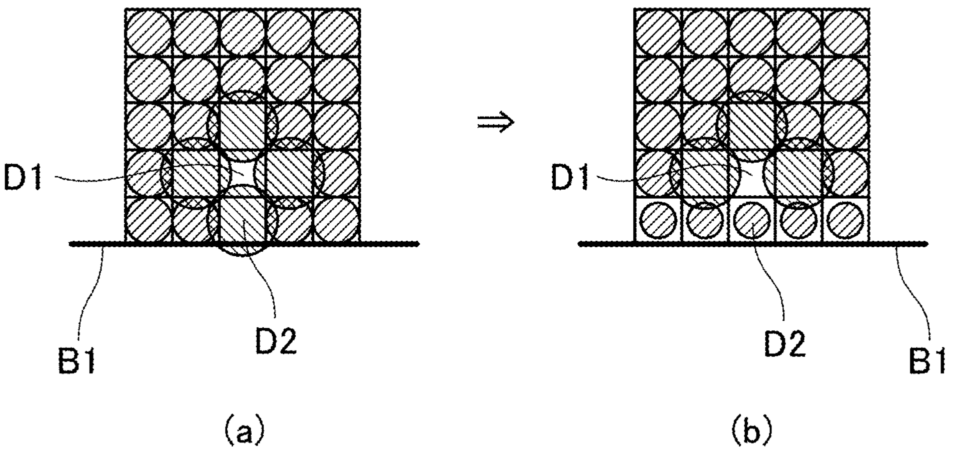
FIG. 12(*a*) shows the state of dots before boundary ejection control is performed, and (b) shows the state of dots when small-sized droplets have been ejected by the boundary ejection control.

In FIG. 12, (a) shows the state of dots before boundary ejection control is performed, and (b) shows the state of dots when small-sized droplets have been ejected by the boundary ejection control. As shown in FIG. 12, when the conforming dots D2 surrounding the non-conforming dot D1 reach the boundary B1 of the painting range in the painting area CP1, the head control unit 90 may control the piezoelectric substrate 62 by means of a command from the main control unit 100 so that the size of droplets of those conforming dots D2 is a droplet size smaller than in the state of normal ejection, instead of a droplet size equal to the size in the state of normal ejection.

When control is performed in this way, it is possible to improve the painting quality at the boundary B1 of the painting area with higher painting resolution.

(f) Rotation of Painting Head 53

Figure 13:
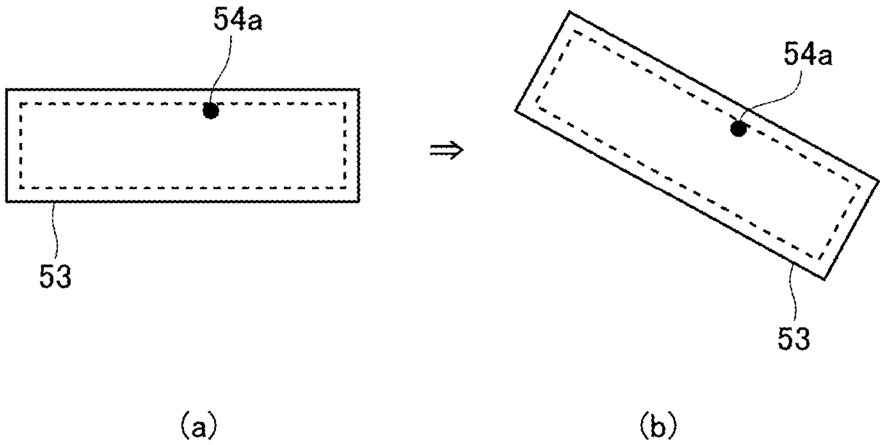
FIG. 13(*a*) shows a state in which a non-conforming nozzle is positioned on an upper side of the painting head, and (b) shows a state in which the painting head has been rotated from the state in (a).

Furthermore, in FIG. 13, (a) shows a state in which the non-conforming nozzle 54*a* is positioned on the upper side of the painting head 53, and (b) shows a state in which the painting head 53 has been rotated from the state in (a). As shown in FIG. 13(*a*), in the recovery control, when the painting area CP1 of the vehicle is inclined beyond the predetermined angle of inclination, it is also feasible for there to be no conforming dot D2 positioned above the non-conforming dot D1, because, for example, the non-conforming nozzle 54*a* is positioned on the upper side of the nozzle-forming face 52, etc. If there is deemed to be no conforming dot D2 positioned above the non-conforming dot D1 in this way, the robot arm control unit 70 may control operation of the robot arm R1 so as to rotate the painting head unit 50 while keeping the painting head unit 50 parallel to the painting area CP1, as shown in FIG. 13(*b*).

When control is performed in this way, a conforming dot D2 can be positioned above the non-conforming dot D1 by rotation of the painting head unit 50, making it possible to limit a drop in painting quality.

(g) Movement Speed of Painting Head Unit 50

Figure 14:
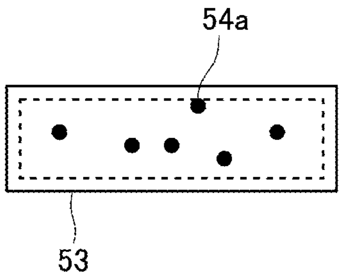
FIG. 14 shows a state of the painting head of the painting robot shown in FIG. 1 when the number of non-conforming nozzles has exceeded a predetermined threshold.

FIG. 14 shows a state in which the number of non-conforming nozzles 54*a* has exceeded a predetermined threshold. It should be noted that FIG. 14 shows six non-conforming nozzles 54*a* as a state in which the predetermined threshold has been exceeded, but the number of non-conforming nozzles 54*a* is not limited to six. As shown in FIG. 14, it is also feasible for the number of non-conforming dots D1 corresponding to non-conforming nozzles 54*a* of the painting head 53 to exceed the predetermined threshold. In such a case, the robot arm control unit 70 may control operation of the robot arm R1 so that a movement speed of the painting head unit 50 in the recovery control is lower than when the predetermined threshold is not exceeded.

In this way, the painting head unit 50 passes through at a lower movement speed than normal, so it is possible to increase the quantity of droplets of conforming dots D2 present around the non-conforming dots D1, enabling the non-conforming dots D1 to be covered.

3. Additional Notes

Details of the disclosure of the embodiment described above will be understood as follows, for example.

[1] Specifically, a painting robot 10 for painting a painting area CP1 of a vehicle comprises: a painting head unit 50 provided with a painting head 53 comprising a plurality of nozzles 54 for ejecting paint droplets, and a piezoelectric substrate 62 which is driven in order to push the droplets out from the nozzles 54; a robot arm R1 which has the painting head unit 50 mounted on a tip end thereof and causes the painting head unit 50 to move to a desired position; and a control unit comprising a head control unit 90 for controlling operation of the piezoelectric substrate 62 of the painting head 53, and a robot arm control unit 70 for controlling operation of the robot arm R1.

Then, if a specific nozzle 54 is deemed to be a non-conforming nozzle 54*a* which is not ejecting the droplets correctly when the vehicle is being painted, the head control unit 90 implements recovery control for controlling driving of the piezoelectric substrate 62 so as to increase the size of droplets of conforming dots D2, which surround a non-conforming dot D1 corresponding to the non-conforming nozzle 54*a* and which correspond to conforming nozzles 54*b* ejecting the droplets without problem, and, in the recovery control: when the conforming dots D2 surrounding the non-conforming dot D1 reach a boundary B1 of a painting range of the painting area CP1, boundary ejection control is implemented so as to make the size of the droplets of the conforming dots D2 a droplet size which is equal to the size in a state of normal ejection when the recovery control is not being implemented, and at this time also, non-boundary ejection control is implemented so that the size of droplets of conforming dots D2, which surround the non-conforming dot D1 and are positioned further inside the painting range than the boundary B1, is greater than that of the conforming dots D2 in the state of normal ejection.

By performing recovery control in this way, it is possible to improve the painting quality by limiting a drop in paint film thickness because the conforming dots D2 are arranged around the non-conforming dot D1. Furthermore, by implementing boundary ejection control at the boundary B1 of the painting area, it is possible to limit coarser painting resolution at the boundary B1 of the painting area, and to prevent a drop in painting quality. Furthermore, the non-boundary ejection control is implemented, where driving of the piezoelectric substrate 62 is controlled so as to increase the size of droplets of the conforming dots D2 which are not at the boundary, and it is therefore possible to limit a drop in painting quality by covering the non-conforming dot D1 corresponding to the non-conforming nozzle 54*a*.

[2] Furthermore, in accordance with the embodiment above and in addition to the details disclosed in [1] above, in the recovery control: (A) when the painting area CP1 of the vehicle is on a horizontal plane or is in a predetermined angle of inclination range close to a horizontal plane, the head control unit 90 may control the piezoelectric substrate 62 so that the size of droplets of a plurality of the conforming dots D2 surrounding the non-conforming dot D1 is greater than that of conforming dots D2 in the state of normal ejection; and (B) when the painting area CP1 of the vehicle is inclined beyond the predetermined angle of inclination, the head control unit 90 may control the piezoelectric substrate 62 so that the size of a droplet of the conforming dot D2 positioned above the non-conforming dot D1 among the plurality of conforming dots D2 surrounding the non-conforming dot D1 is greatest among the conforming dots D2 surrounding the non-conforming dot D1, and at this time also, the head control unit 90 may control the piezoelectric substrate 62 so that the size of droplets of conforming dots D2 other than that positioned above the non-conforming dot D1 is greater than in the state of normal ejection, or equal to the size in the state of normal ejection.

When control is performed in this way, if the painting area CP1 of the vehicle is on a horizontal plane or is in a predetermined angle of inclination range close to a horizontal plane, the dots of droplets which have landed do not flow downward to a great extent, and operation of the piezoelectric substrate 62 is therefore controlled so that the size of droplets of a plurality of the conforming dots D2 surrounding (not just above) the non-conforming dot D1 is greater than that of conforming dots D2 in the state of normal ejection, whereby it is possible to limit a drop in painting quality by covering the non-conforming dot D1 corresponding to the non-conforming nozzle 54*a*.

Thus, when the painting area CP1 of the vehicle is inclined beyond the predetermined angle of inclination, operation of the piezoelectric substrate 62 is controlled so that the size of a droplet of the conforming dot D2 positioned above the non-conforming dot D1 is greatest among the conforming dots D2 surrounding the non-conforming dot D1. By this means, when the paint flows downward from above from the droplet of the conforming dot D2, it is possible to achieve a state in which the flowing paint conceals (covers) the non-conforming dot D1, and it is possible to limit a drop in painting quality.

Furthermore, even if paint flows from droplets of conforming dots D2 other than the conforming dot D2 positioned above the non-conforming dot D1, it is not possible to achieve a state in which the flowing paint conceals the non-conforming dot D1. Operation of the piezoelectric substrate 62 is therefore controlled so that the size of droplets of these conforming dots D2 is greater than in the state of normal ejection (but still preferably smaller than the conforming dot D2 positioned above), or equal to the size in the state of normal ejection, whereby it is possible to limit variations in paint film thickness and to prevent a drop in painting quality.

[3] Furthermore, in accordance with the embodiment above and in addition to [1] and [2] above or details disclosed in a combination thereof, in the recovery control: when it is determined that there is a non-conforming dot D1 for which the painting defect caused by the non-conforming nozzle 54*a* has not been resolved by controlling the size of the droplets within a first painting path P1 which is the same painting path, the head control unit 90 may perform supplementary control in which an overlap region OL overlapping the first painting path P1 is provided on a second painting path P2 which is a subsequent painting path, and conforming dots D2 positioned over the non-conforming dot D1 are provided within the overlap region OL.

In this way, the non-conforming dot D1 remaining within the first painting path P1 is concealed by conforming dots D2, and it is therefore possible to prevent a gap in painting at the location of the remaining non-conforming dot D1, and to prevent a drop in painting quality.

[4] Furthermore, in accordance with the embodiment above and in addition to the details disclosed in any of [1] to [3] above or a combination thereof, in the boundary ejection control of the recovery control, the head control unit 90 may control the piezoelectric substrate 62 so that the size of droplets of conforming dots D2 is a droplet size smaller than in the state of normal ejection, instead of a droplet size equal to the size in the state of normal ejection.

By performing control in this way, it is possible to achieve higher painting resolution at the boundary B1 of the painting area. This makes it possible to improve painting quality.

[5] Furthermore, in accordance with the embodiment above and in addition to the details disclosed in any of [1] to [4] above or a combination thereof, in the recovery control: when the painting area CP1 of the vehicle is inclined beyond the predetermined angle of inclination, if there is deemed to be no conforming dot D2 positioned above the non-conforming dot D1, the robot arm control unit 70 may control operation of the robot arm R1 so as to rotate the painting head unit 50 while keeping the painting head unit 50 parallel to the painting area CP1.

By performing control in this way, a conforming dot D2 can be positioned above the non-conforming dot D1 by rotation of the painting head unit 50. By this means, the paint flows from the conforming dot D2 toward the non-conforming dot D1, making it possible to achieve a state in which the non-conforming dot D1 is concealed (covered), and it is possible to limit a drop in painting quality.

[6] Furthermore, in accordance with the embodiment above and in addition to the details disclosed in any of [1]

to [5] above or a combination thereof, when it is determined that the number of non-conforming dots D1 corresponding to non-conforming nozzles 54*a* in the painting head 53 exceeds a predetermined threshold, the robot arm control unit 70 controls operation of the robot arm R1 so that a movement speed of the painting head unit 50 in the recovery control is lower than when the predetermined threshold is not exceeded.

When control is performed in this way, the painting head 53 passes through the conforming dots D2 and non-conforming dots D1 more slowly than the normal movement speed of the painting head 53. Consequently, it is possible to increase the quantity of droplets of conforming dots D2 present around the non-conforming dots D1, enabling the non-conforming dots D1 to be covered. This makes it possible to limit a drop in painting quality.

4. Variant Examples

An embodiment of the present invention was described above, but the present invention may be modified in various ways in addition to this embodiment. Variant examples will be described below.

In the embodiment above, painting may be performed while applying slight vibration to the painting head 53. By imparting slight vibration to the painting head 53, paint can also be caused to land at locations of non-conforming dots D1.

Furthermore, in the recovery control of the embodiment above, when there is one non-conforming dot D1, driving of the piezoelectric substrate 62 is controlled for conforming dots D2 surrounding the non-conforming dot D1 so as to increase the size of droplets of the corresponding conforming dots D2. However, in the recovery control, even if there are multiple adjacent non-conforming dots D1, driving of the piezoelectric substrate 62 may still be controlled so as to increase the size of droplets of the surrounding conforming dots D2, to thereby prevent painting gaps and prevent a drop in painting quality.

Figure 15:
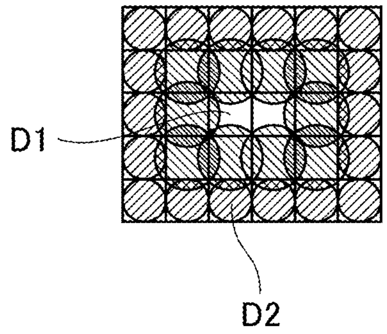
FIG. 15 relates to a variant example of the present invention and shows a state in which, when there are two adjacent non-conforming dots, the size of droplets of surrounding conforming dots is increased.
Figure 16:
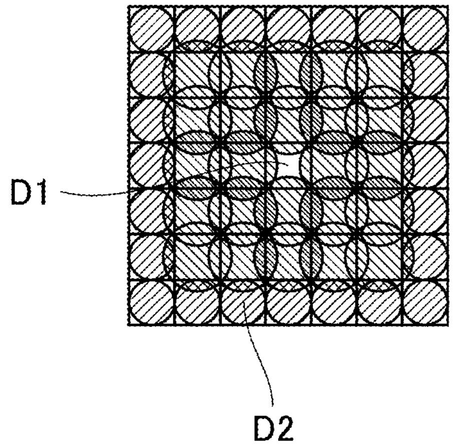
FIG. 16 relates to a variant example of the present invention and shows a state in which the size of droplets is increased not only for conforming dots immediately adjacent to a non-conforming dot, but also for conforming dots adjacent to said immediately-adjacent conforming dots.

FIG. 15 shows an example of such a state. FIG. 15 shows a state in which, when there are two adjacent non-conforming dots D1, conforming dots D2 having a large droplet size are arranged around the non-conforming dots D1. It should be noted that FIG. 15 shows a state in which there are two adjacent non-conforming dots D1, but even if there are three or more adjacent non-conforming dots D1, recovery control may still be performed so as to increase the droplet size of the surrounding conforming dots D2, provided that a painting gap is not produced in that range.

Furthermore, in the recovery control of the embodiment above, driving of the piezoelectric substrate 62 is controlled for conforming dots D2 adjacent to the non-conforming dot D1 so as to increase the size of droplets of the corresponding conforming dots D2. However, provided that painting gaps can be prevented, it is equally possible to increase the size of droplets not only for the conforming dots D2 immediately adjacent to the non-conforming dot D1, but also for the conforming dots D2 adjacent to said immediately-adjacent conforming dots D2 Furthermore, it is also possible to make the droplets of the conforming dots D2 immediately adjacent to the non-conforming dot D1 normal size, but to increase the size of droplets of the conforming dots D2 adjacent to the normal-sized conforming dots D2, and it is further possible to increase the droplet size of any conforming dots D2 among the conforming dots D2 present within a predetermined range of the non-conforming dot D1.

KEY TO SYMBOLS

1 . . . Painting system, 10 . . . Painting robot, 20 . . . Robot main body, 21 . . . Stand, 22*a* . . . First rotary shaft, 22*b* . . . Second rotary shaft, 22*c* . . . Third rotary shaft, 22*d* . . . Fourth rotary shaft, 22*e* . . . Fifth rotary shaft, 22*f* . . . Sixth rotary shaft, 23 . . . Leg portion, 24 . . . First pivot arm, 25 . . . Second pivot arm, 26 . . . Rotating arm, 27 . . . Wrist portion, 40 . . . Paint supply unit, 41 . . . Supply line, 42 . . . Return flow path, 50 . . . Painting head unit, 52 . . . Nozzle-forming face, 53 . . . Painting head, 54 . . . Nozzle, 54*a* . . . Non-conforming nozzle, 54*b* . . . Conforming nozzle, 55 . . . Nozzle row, 55A . . . First nozzle row, 55B . . . Second nozzle row, 57 . . . Supply-side large flow path, 58 . . . Row-direction supply flow path, 59 . . . Nozzle pressurization chamber, 59*a* . . . Nozzle supply flow path, 59*b* . . . Nozzle discharge flow path, 60 . . . Row-direction discharge flow path, 61 . . . Discharge-side large flow path, 62 . . . Piezoelectric substrate, 63*a* . . . Piezoelectric ceramic layer, 63*b* . . . Piezoelectric ceramic layer, 64 . . . Common electrode, 65 . . . Individual electrode, 70 . . . Robot arm control unit, 71 . . . Memory, 80 . . . Paint supply control unit (corresponding to pressure control unit), 90 . . . Head control unit, 100 . . . Main control unit, 110 . . . Position sensor, 120 . . . Inclination sensor, 200 . . . Image processor, 210 . . . Image processing unit, 220 . . . Memory, B1 . . . Boundary, CP1 . . . Painting area, D1 . . . Non-conforming dot, D2 . . . Conforming dot, M1-M6 . . . Motor, OL . . . Overlap region, P1 . . . First painting path, P2 . . . Second painting path, R1 . . . Robot arm

The invention claimed is:

1. A painting robot for painting a painting area of a vehicle, the painting robot comprising:

a painting head unit provided with a painting head comprising a plurality of nozzles for ejecting paint droplets, and a piezoelectric substrate which is driven in order to push the droplets out from the nozzles;

a robot arm which has the painting head unit mounted on a tip end thereof and causes the painting head unit to move to a desired position; and a control unit comprising a head control unit for controlling operation of the piezoelectric substrate of the painting head, and a robot arm control unit for controlling operation of the robot arm, wherein:

if a specific nozzle is deemed to be a non-conforming nozzle which is not ejecting the droplets correctly when the vehicle is being painted, the head control unit implements recovery control for controlling driving of the piezoelectric substrate so as to increase the size of droplets of conforming dots, which surround a non-conforming dot corresponding to the non-conforming nozzle and which correspond to conforming nozzles ejecting the droplets without problem, and, in the recovery control:

when the conforming dots surrounding the non-conforming dot reach a boundary of a painting range of the painting area, boundary ejection control is implemented so as to make the size of the droplets of the conforming dots a droplet size which is equal to the size in a state of normal ejection when the recovery control is not being implemented, and at this time also, non-boundary ejection control is implemented so that the size of droplets of conforming dots, which surround the non-conforming dot and are positioned further inside the painting range than the boundary, is greater than that of the conforming dots in the state of normal ejection.

2. The painting robot according to claim 1, wherein:

in the recovery control:

(A) when the painting area of the vehicle is on a horizontal plane or is in a predetermined angle of inclination range close to a horizontal plane, the head control unit controls the piezoelectric substrate so that the size of droplets of a plurality of the conforming dots surrounding the non-conforming dot is greater than that of conforming dots in the state of normal ejection; and (B) when the painting area of the vehicle is inclined beyond the predetermined angle of inclination, the head control unit controls the piezoelectric substrate so that the size of a droplet of the conforming dot positioned above the non-conforming dot among the plurality of conforming dots surrounding the non-conforming dot is greatest among the conforming dots surrounding the non-conforming dot, and the head control unit controls the piezoelectric substrate so that the size of droplets of conforming dots other than that positioned above the non-conforming dot is greater than in the state of normal ejection, or equal to the size in the state of normal ejection.

3. The painting robot according to claim 2, wherein:

in the recovery control:

when the painting area of the vehicle is inclined beyond the predetermined angle of inclination, if there is deemed to be no conforming dot positioned above the non-conforming dot, the robot arm control unit controls operation of the robot arm so as to rotate the painting head unit while keeping the painting head unit parallel to the painting area.

4. The painting robot according to claim 1, wherein:

in the recovery control:

when it is determined that there is a non-conforming dot for which the painting defect caused by the non-conforming nozzle has not been resolved by controlling the size of the droplets within a first painting path which is the same painting path, the head control unit performs supplementary control in which an overlap region overlapping the first painting path is provided on a second painting path which is a subsequent painting path, and conforming dots positioned over the non-conforming dot are provided within the overlap region.

5. The painting robot according to claim 1, wherein:

in the boundary ejection control of the recovery control, the head control unit:

controls the piezoelectric substrate so that the size of droplets of conforming dots is a droplet size smaller than in the state of normal ejection, instead of a droplet size equal to the size in the state of normal ejection.

6. The painting robot according to claim 1, wherein:

when it is determined that the number of non-conforming dots corresponding to non-conforming nozzles in the painting head exceeds a predetermined threshold, the robot arm control unit controls operation of the robot arm so that a movement speed of the painting head unit in the recovery control is lower than when the predetermined threshold is not exceeded.

* * * * *